United States Patent [19]

Hauet et al.

[11] Patent Number: 4,917,352

[45] Date of Patent: Apr. 17, 1990

[54] INJECTOR FOR ENGINE WITH SPARK IGNITION AND DIRECT INJECTION

[75] Inventors: Bertrand Hauet, Issy Les Moulineaux; Jean-Pierre Jourde, Croissy Sur Seine; Christian Ozenfant, Les Clayes Sous Bois; Claude Dabert, Vilette De Vienne, all of France

[73] Assignee: Regie Nationale Des Usines Renault, Boulogne Billancourt, France

[21] Appl. No.: 191,137

[22] Filed: May 6, 1988

[30] Foreign Application Priority Data

May 12, 1987 [FR] France ................................. 87 06632

[51] Int. Cl.⁴ ...................... F02M 51/06; F16K 31/02
[52] U.S. Cl. ................ 251/129.19; 123/472; 239/585; 251/129.21
[58] Field of Search ............ 251/129.21; 239/585; 123/472, 473, 478

[56] References Cited

U.S. PATENT DOCUMENTS

| | | | |
|---|---|---|---|
| 2,721,100 | 10/1955 | Bodine, Jr. | 251/129.21 |
| 4,304,258 | 12/1981 | Mitchell | 251/129.19 |
| 4,331,317 | 5/1982 | Kamai et al. | 251/129.21 |
| 4,356,980 | 11/1982 | Krauss | 251/129.21 |
| 4,385,339 | 5/1983 | Takada et al. | 251/129.21 |
| 4,700,891 | 10/1987 | Hans et al. | 251/129.21 |
| 4,726,389 | 2/1988 | Minowa et al. | 251/129.21 |
| 4,783,009 | 11/1988 | Coates | 239/585 |
| 4,844,339 | 7/1989 | Sayer et al. | 239/585 |

FOREIGN PATENT DOCUMENTS

| | | |
|---|---|---|
| 0051009 | 1/1985 | European Pat. Off. . |
| 0090739 | 3/1986 | European Pat. Off. . |
| 0119894 | 6/1987 | European Pat. Off. . |
| 214717 | 9/1960 | Fed. Rep. of Germany .................. 251/129.21 |

Primary Examiner—George L. Walton
Attorney, Agent, or Firm—Oblon, Spivak, McClelland, Maier & Neustadt

[57] ABSTRACT

Electromagnetic injector of the pressure-time type, which comprises a toric electromagnet coil (2, 12) of the axisymmetric solid type, housed in a magnetic circuit support (13), as well as a mobile element consisting of a plane plate (3) solid with a liner (4) which moves a suspended needle (18) forming with a seat (45, 19), reverse clack (41) of the injector, the needle being kept at rest by return spring (20).

6 Claims, 1 Drawing Sheet

INJECTOR FOR ENGINE WITH SPARK IGNITION AND DIRECT INJECTION

BACKGROUND OF THE INVENTION

1. Field of the Invention

Direct injection on engines with spark ignition automatically involves the process of stratified charge combustion which offers an alternative to the combustion processes called "lean mixture" by preparation of the mixture upstream from the intake valve or valves.

2. Background of the Related Art

The combustion chambers of engines with stratified charge are two types: secondary chamber and open chamber. Very numerous efforts have been conducted by designers from the world over, the most famous for the so-called open-chamber engines perhaps being those of the PROCO processes developed by FORD.

To be able to provide the conditions for correct combustion in the open-chamber stratification process, the latter being in the piston for a four-cycle engine or in the cylinder head for a two-cycle engine, the injection system and mainly the injector should have three essential qualities:

1. An ability to assure an excellent atomization of the fuel,
2. An ability to allow the penetration of the fuel jet into the chamber adapted to the conditions of engine speed and load,
3. An ability to deliver very small amounts of fuel in a stable and repetitive manner.

It has been known for a long time that the use of sonic phenomena gives an excellent atomization of air or gas and fuel mixtures, the gas pressure, being referenced either by its ratio to the manifold pressure (partial vacuum) or by its ratio to the cylinder pressure at the moment of injection, at a ratio close to 2. More recently, and in the case of development of an injection system for a 2-cycle engine, the ORBITAL company (Australia) has developed such a system, claiming such atomization.

SUMMARY OF THE INVENTION

The object of the present invention is an electromagnetic injector of the pressure-time type having dynamic characteristics allowing very small injected amounts in a stable and repetitive manner, causing an excellent atomization without outside contrivance such as the use of compressed air, and in which penetration of the jet can be modulated by regulating the fuel pressure. Further, the injector is of the one-way clack type, not posing any problem relative to the combustion pressure when it is installed directly in the combustion chamber of an engine.

Further, its internal arrangement is especially designed so that its cost is not too high.

The injector is of the pressure-time type, i.e., the amount of injected fuel is solely a function of the fuel passage section, of the fuel pressure upstream from this section at the moment of injection and of the time of opening of said section.

According to an essential feature, it is made up of an electromagnetic coil of the toric axisymmetric solid type, and a mobile element consisting of a plane plate solid with a liner which moves a needle forming, with a seat, an inverted clack of the injector, said needle being kept at rest by a return spring. The travel of the mobile element, and consequently of that of the opening of the clack, is such that with a known and suitable shape of the seats of the clack, the fuel is very finely atomized in the form of a conical fuel film. The mobile element is in perfect hydrostatic equilibrium in the fuel under pressure prevailing in the body of the injector, the fuel pressure being achieved by a gear pump, for example, driven by a d.c. electric motor, so that only the forces developed by the electromagnet and by the springs provide the balances of the mobile parts of the injector. As indicated above, penetration of the conical jet therefore can be modulated by the pressure of the fuel which can vary, for example, by acting on the control voltage of the electric motor of the gear pump or with an electronically aided pressure regulator.

Separate movements of the electromagnetic element and of the needle valve during opening make it possible to obtain a slower opening than closing, a design guaranteeing a linear response, allowing very small flows in a stable and repetitive manner with a linear response during injection—i.e., amount—amount injected per stroke.

Further, this separation relaxes the production tolerances in regard to centering the various parts.

BRIEF DESCRIPTION OF THE DRAWINGS

Other features and advantages of the invention will come out more clearly from reading the following description of a preferred embodiment, given by way of nonlimiting example, with reference to the accompanying drawings in which.

DETAILED DESCRIPTION OF THE PREFERRED EMBODIMENTS

Figures 1, 2:
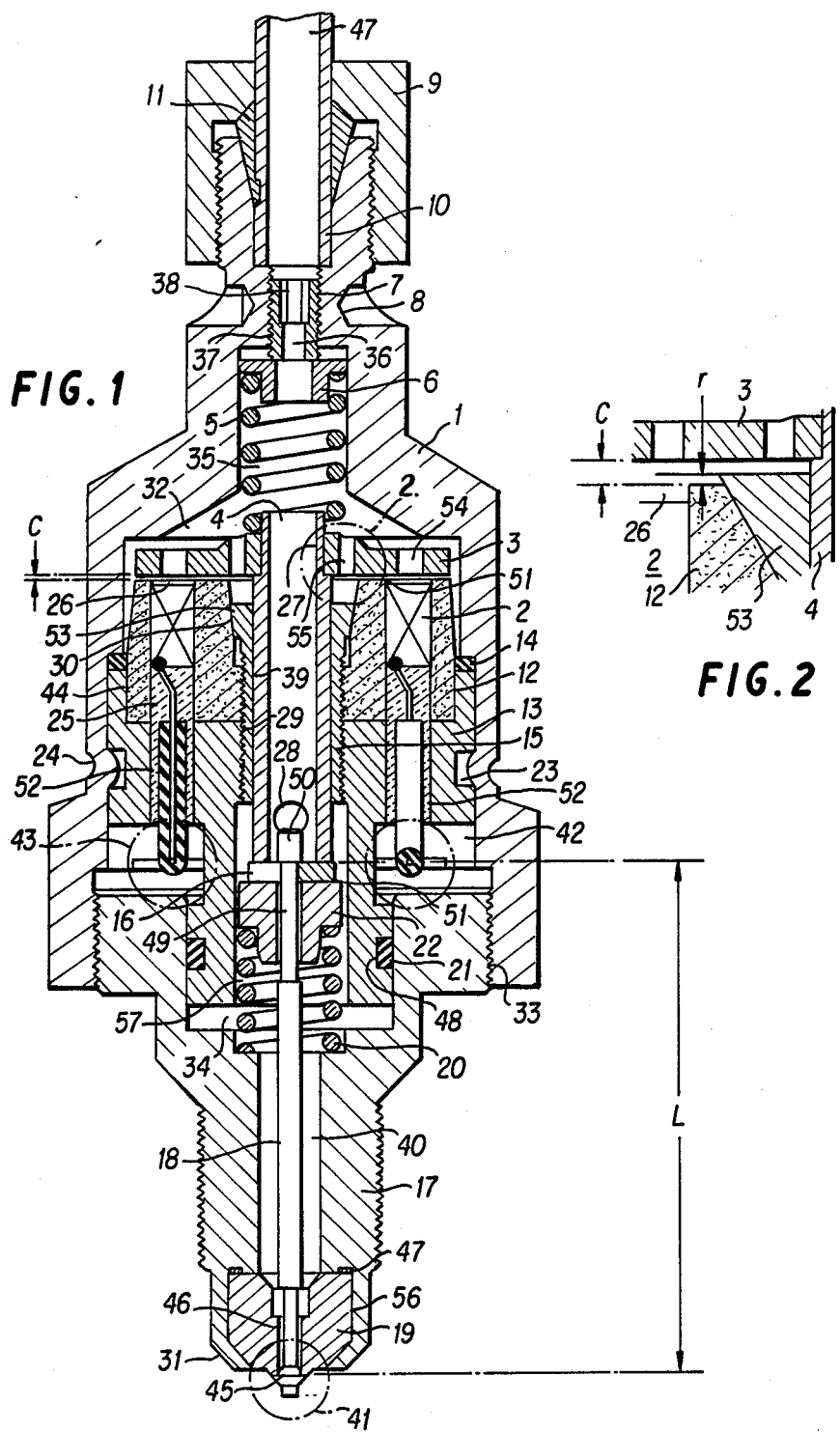
FIG. 1 is a view in longitudinal and axial section of this injector.
FIG. 2 is a view in detail of a plate illustrated in FIG. 1.

According to these figures, such an injector comprises a body 1 comprising downward:

a head especially made for fastening of pressurized fuel supply tube 10 coming from a pump (not shown here). There are involved well-known standard couplings and oval-shaped fittings 9 and 11, a body 1 defining tapped narrowing 37 whose role will be explained below, bores in body 1 with increasing diameters 35, 32 and 42, the bottom of the body 1 being tapped at 33 to receive a support 17 called an injector needle support.

In bore 42 of body 1 is mounted a magnetic circuit support 13 comprising in its upper part a bore 44 in which is fitted-glued magnetic circuit 12 to which it is axisymmetric solid, said magnetic circuit having a toric groove 51 in which is glued a toric wire coil 2, support 13 having two holes 52 allowing the exit of the wires of coil 2 with suitable electrical insulating means. Support 13 further comprises on its outside diameter a groove 23 which is used as a crimping groove 24 of body 1 on support 13, support 13 at the moment of crimping being kept supported via a seal 14 at the bottom of clearance 42 of the inside body 1. Body 15 of smaller diameter is fitted within body 1 and at its lower part has a groove 48 in which is mounted an O ring 21.

Further, in the tapped upper part of central bore 29 of body 13 is screw mounted, a bushing 53 whose tapered outside part 30 located at its upper part rests on the corresponding tapered part of magnetic circuit 12; the material of this bushing 53 is preferably magnetic and of tempered steel. In bore 39 of said bushing 53 can slide, in a perfectly guided manner, a lining 4 to which is fastened at its upper part a circular plate 3 which represents, with liner 4, the mobile part of the electromagnet. The junction of plate 3 and electromagnet 12 defines an annular space 26 and plate 3 has holes 54 and 55 to cause hydraulic dampings identical with those of the mobile element of the electromagnet described in French patent application No. 83.05133.

The lower part of body 1, which comprises bore 42, comprises a tapped part 33 in which is mounted support 17 of injector needle 18. Support 17, whose outside shape is made so as to be able to fasten the injector unit to the engine cylinder head, comprises in its upper part a large bore 34 which will fit, on mounting, the bottom of support 13 of the above electromagnet.

Further, support 18 is drilled with a bore 40 and comprises, in its lower part, a bore 56 with a larger diameter than bore 40. In this bore 56 is placed a needle seat 19 which is mounted in said bore by crimping of end 31 of body 17, the seal between needle seat 19 and support 17 being achieved with a metal joint 47.

Needle seat 19 comprising a seat 45 itself which forms with the lower part of needle 18 a so-called reverse clack 41 of standard geometry. The upper part of needle 17 comprises a screw machined part 49 located below a head 50, the difference in diameters of parts 50 and 49 allowing the passage of the split part of a washer 16. Said washer 16 is mounted to rest on a cup 22 whose upper part has a centering 51 fitting the outside diameter of washer 16. In the lower part of cup 21 a centering receives a spring 20 whose lower part rests on the bottom of a centering clearance located at the bottom of bore 34 of support 17. By the action of said spring 20, of cup 22, of split washer 16 and needle head 50, needle 18 is kept resting on seat 45.

Further, the lower part of line 4 rests on washer 16. The degree of insertion of needle support 17 into body 1 by thread 33 is regulated to obtain a gap c between plate 3 and the top of electromagnet 12. This gap c, reduced by space r corresponding to the amount by which the head of bushing 53 extends beyond the upper face of electromagnet 12 represents the travel of injector needle 18 relative to its seat 45.

Moreover, the tops of plate 3 and line 4 are made to receive a spring 5 whose upper part rests on a washer 6 itself supported on a screw 36 which can be adjusted in travel in a thread 37 located at the upper part of body 1. Said screw 36 is pierced by a bore 38 allowing the passage of fuel and the adjustment of said screw by a suitable means. The height of body 1 further comprises two bores 8 located at thread 37 allowing, by permanent deformation of the bottoms of holes 8, a locking of screw 37.

The description of the operation of the injector will make it possible to explain the role of the above parts.

At rest, i.e., without electric excitation of the electromagnet, the fuel under pressure which penetrates into the body of injector 1 by tube 47 reaches the seat 45 of needle via holes 36 and 35, via liner 4 pierced with two holes 28 and via four, 57 and 40. Because of the respective tensions of the two countersprings 20 and 5, needle 18 is pressed on its seat with a force greater than that due to the fuel pressure on said needle. The respective forces of the two springs being respectively on the order of 100N for spring 20 and 20N for spring 5, the resting force of the needle on its seat is capable of sealing a fuel pressure greater than 8 MPa (80 bars) without any problem.

In this rest position, the only forces that are exerted on the mobile element, consisting of liner 4 and plate 3, are the combined forces of the two springs 5 and 20, since the entire mobile element unit is in contact on all its active faces with the liquid, and is therefore in complete hydrostatic equilibrium. When winding 2 of the electromagnet is excited, and when the force developed by the latter exceeds the forces of the countersprings, the plate 3 is pulled downward toward the electromagnet. At this moment, the action of the lower part of liner 4 on the top of washer 16 frees needle 18 of the injector which opens only under the action of forces due to the fuel pressure on the section of the needle at its seat 45. When the electromagnet is live energized, plate 3 has traveled its path c-r and therefore rests on the head of bushing 53. In an identical way, the top of split washer 16 is moved by c-r and head 50 of needle 18 can move until it comes to rest on the upper part of washer 16, the travel of needle 18 thus corresponds to c-r. When energization of the winding of the electromagnet is stopped, the electromagnetic forces being exerted on plate 3 disappear and under the effect of the differential forces due to springs 20 and 5, split washer 16 comes back into rest position, very quickly bringing needle 18 onto its seat 45 via its head 50, and moves plate 3 via liner 4 to its initial position.

It is very important to note the nature of the forces being exerted on needle 18 during its movements, i.e., its opening is assured by hydraulic forces which remain relatively weak. For example, in the case of a preferred embodiment, seat 45 has a diameter of 2.2 mm, i.e., the hydraulic forces being exerted on the needle are 3.8N with a fuel pressure of 10 bars and 30.4N with 80 bars; on the other hand, the return forces of said needle are due only to the springs and are on the order, according to the above, of 80N, the electromagnet developing, on being actuated a force on the order of 200N. Therefore, it is by these calculated values, that in all cases the forces at the opening of the needle are less than those that close it, which corresponds to the characteristic of a mobile element that is slower in opening than in closing and therefore that gives rise to a perfectly linear response, even for slight flows.

Another feature of the injector is the mode of suspension of needle 18; actually, it can be gathered from the above descriptions and from the figure that it is not absolutely guided; rather, it has a relatively great length L, its fastening being located in the part farthest away from its seat. This design avoids a guiding of the needle which always falls, of course, on its seat since it is drawn at a point far from it. It is obvious that the embodiment described above is not limiting and that, with another design of washer 16, compression spring 20 can be replaced by a draw spring which, in this case, would be fastened by a suitable means at the top of body 1, this variant further offering arrangements for adjustment of said draw spring, whose role will be identical with that of spring 20.

We claim:
1. An electromagnetic injector for an engine with spark ignition and direct injection, said injector comprising:
   a body having a support defining a valve seat;
   a needle in said housing and cooperating with said valve seat to form a reverse clack;

means for suspending said needle such that it closes said clack, said suspending means including a return spring;

mobile means movable for releasing suspension of said needle, said mobile means comprising a plane plate and a liner fixed thereto;

means connected to said body for delivering a pressurized fuel to said clack; and an electromagnetic coil in said body and comprising means for moving said mobile means to a position for releasing suspension of said needle so that said clack may be opened by fluid pressure of said fuel, wherein said suspending means further comprise:

a headed end of said needle support opposite said clack; and means biased by said return spring for engaging said headed end to close said clack;

wherein an end of said liner opposite said flat plate contacts said engaging means, said end of said liner moving said engaging means away from said headed end when said electromagnetic coil is energized so that said needle is movable independently of said return spring, whereby upon actuation of said electromagnetic coil the suspension of said needle is released so that said clack is slowly opened and whereby said clack is rapidly closed by said return spring when said electromagnetic coil is not actuated.

2. The injector of claim 1 wherein said electromagnetic coil is an axisymmetric solid type toric coil fixed in said body and surrounding said liner, said flat plate being positioned at an end of said coil opposite said needle.

3. The injector of claim 1 or 2 wherein said means for delivering a pressurized fuel to said clack includes a bore extending through said liner.

4. The injector of claim 1 wherein said engaging means comprise a cup and a split washer.

5. The injector of claim 1 wherein said support lacks guide bearings for said needle.

6. The injector of claim 1 wherein said mobile means is in quasi-hydrodynamic equilibrium, whereby a response time of said needle is not affected by a magnitude of a fluid pressure acting on said mobile element.

* * * * *